Figure 1:
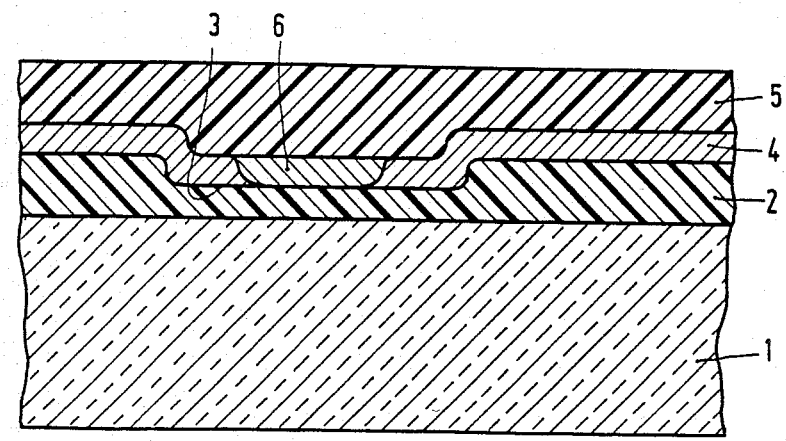

United States Patent [19]

Gravesteijn et al.

[11] Patent Number: 4,647,944
[45] Date of Patent: Mar. 3, 1987

[54] METHOD FOR THE OPTICAL RECORDING OF INFORMATION AND AN OPTICAL RECORDING ELEMENT USED IN THE METHOD

[75] Inventors: Dirk J. Gravesteijn; Carolus J. Van Der Poel, both of Eindhoven, Netherlands

[73] Assignee: U.S. Philips Corporation, New York, N.Y.

[21] Appl. No.: 831,781

[22] Filed: Feb. 21, 1986

[30] Foreign Application Priority Data

Nov. 25, 1985 [NL] Netherlands ................. 8503235

[51] Int. Cl.⁴ ............................................. G01D 15/34
[52] U.S. Cl. ..................................... 346/1.1; 346/76; 346/135.1; 365/113; 430/346; 430/945
[58] Field of Search ................ 346/1.1, 76 L, 135.1; 365/113; 430/945, 346, 348

[56] References Cited

U.S. PATENT DOCUMENTS

| | | | |
|---|---|---|---|
| 3,530,441 | 9/1970 | Ovshinsky | 365/113 |
| 3,716,844 | 2/1973 | Brodsky | 430/346 |
| 4,238,803 | 12/1980 | Terao | 346/1.1 |
| 4,307,408 | 12/1981 | Kiyohara | 346/76 L |
| 4,460,636 | 7/1984 | Watanabe | 346/135.1 X |

Primary Examiner—Joseph W. Hartary
Attorney, Agent, or Firm—Norman N. Spain

[57] ABSTRACT

A method for the optical recording of information in which a recording layer 4 of $In_xSb_{1-x}$, $Ga_xSb_{1-x}$ or $(InSb)_y Se_{1-y}$, wherein $0.4 \leq x \leq 0.6$ and $0.7 \leq 1.0$, or mixtures thereof, provided on a synthetic resin substrate (2) (FIG. 1) in a maximum layer thickness of 150 nm is exposed to infrared laser light having a wavelength of 750-900 nm which is pulsated in accordance with the binary information to be recorded with a pulse time of at most 200 ns, a crystalline area 6 (bit) having maximum dimensions of a few micrometers being formed in the amorphous layer in the exposed places, as well as an optical recording element used in the method.

3 Claims, 2 Drawing Figures

METHOD FOR THE OPTICAL RECORDING OF INFORMATION AND AN OPTICAL RECORDING ELEMENT USED IN THE METHOD

The invention relates to a method for the optical recording of information in which a recording element which comprises a substrate and a recording layer provided thereon is exposed to laser light which is modulated in accordance with the information to be recorded, in which an optically readable change in structure occurs in the recording layer in the exposed places which is read by means of laser light via the substrate on the basis of differences in reflection with the surroundings.

Various systems for such an optical recording are known. A system which is interesting for practical applications is the so-called ablative system. In this system a recording layer of, for example, Bi, a TeSe alloy or a dye is used in which holes or cavities are formed upon exposure to light. The holes or cavities are read by means of weak laser light on the basis of differences in reflection between a hole or cavity and the surroundings thereof.

A practical disadvantage is that an air gap must be present above such an abblative recording layer. In practice, two ablative recording elements are interconnected, the recording layers facing each other, and spacers are used in order to provide an air- (c.q. gas) gap between the recording layers. Hence the recording layer cannot be provided with a protective coating layer, for example, a coating lacquer layer.

A second system of optical recording is the phase change system. The recording layer used in this system is a layer of a semiconductor material, notably a TeSe alloy, to which various other elements, for example, As, Sb, S, may be added. Upon exposure to laser light, change in structure occurs in the exposed places, amorphous information bits being formed in a crystalline layer, or conversely. The system is reversible so that, for example, by exposure to laser light, the amorphous information bits are converted again into crystalline material. The phase change system is known inter alia from U.S. Pat. No. 3,530,441. For practical application of this system, for example in the case of a Te-Se-Sb recording layer, the starting material is a crystalline layer in which amorphous bits are formed reversibly. The recording layer is provided on a supporting plate (substrate) by means of a sputtering process. The initially amorphous recording layer must first of all be converted into a crystalline layer by a temperature treatment. This presents problems when a synthetic resin supporting plate (substrate) is used because the synthetic resin cannot withstand a temperature treatment of, for example, 120° C. for one hour. The recording layer must have a comparatively high crystallization temperature because otherwise the layer has an insufficient stability and hence the stability of the recording element is restricted. The synthetic resin polymethyl methacrylate (PMMA) which, due to the low birefringence, is very suitable as such for use in a recording element is deformed and degraded by the temperature treatment. The synthetic resin polycarbonate provides too high a birefringence as a result of the temperature treatment. As a result of this the information recorded in the recording layer can no longer be read. Cross-linked synthetic resins, for example, the acrylate resins cross-linked by means of light, cannot withstand the above-mentioned temperature treatment either. The temperature treatment is an extremely critical process.

It is to be noted that reading takes place on the basis of differences in reflection of the reading laser light which is focused on the recording layer via the transparent substrate plate. The above-mentioned disadvantage could possibly be avoided by not using the temperature treatment and starting from an amorphous layer in which crystalline information bits are formed by exposure to radiation. However, this local crystallization is a long-lasting process. In column 1, lines 60–65 of the above-mentioned U.S. Pat. No. 3,530,441 the use of a pulse duration of 1–100 milliseconds or more is mentioned to convert amorphous material locally into crystalline material.

It is an important object of the present invention to achieve a recording pulse time of at most 200 ns (nanoseconds).

Another important object of the invention is to provide a method in which the recording layer is provided on a synthetic resin substrate and in which no damage or deformation of the synthetic resin occurs as a result of the exposure to pulsated laser light.

Still another object is to provide a high information density in which the recorded binary information bits have maximum dimensions of a few micrometers.

A further object is to provide a method in which the recorded information can be kept for a very long period of time, i.e. is not degraded.

Still another object is to optically read the recorded information with a high signal-to-noise ratio.

According to the invention, these objects are achieved by means of a method of the type mentioned in the opening paragraph which is characterized in that an amorphous recording layer of $In_xSb_{1-x}$, $Ga_xSb_{1-x}$ or $(InSb)_ySe_{1-y}$ wherein $0.4 \leq x \leq 0.6$ and $0.7 \leq y < 1.0$ or mixtures thereof, is provided on a synthetic resin substrate in a maximum thickness of 150 nm, is exposed to infrared laser light having a wavelength of 750–900 nm which—is pulsated in accordance with the binary (digital) information to be recorded with a pulse time of at most 200 ns, crystalline area (bits) with maximum dimensions of a few micrometers being formed in the amorphous layer in the exposed places.

The above-mentioned amorphous recording layer is provided on the synthetic resin substrate by means of a sputtering process or a vapor deposition process. The sputtered or vapor-deposited layer is amorphous. The synthetic resin substrate is, for example, a synthetic resin substrate of polymethyl methacrylate or polycarbonate. The substrate may alternatively be manufactured, for example, from glass and be coated with a synthetic resin layer on which the recording layer is then provided. Such a synthetic resin layer is, for example, a layer of a UV light cured, monomer composition, for example, a mixture of mono-, di-, tri- and/or tetraacrylates. A spiral-like groove may be provided in the synthetic resin substrate. As a result of this, the thin recording layer also has a groove. The groove serves for the control of the laser light beam. The groove, also called a servo track, may comprise servo data in the form of information (servo) areas which are situated alternately at a higher level and at a lower level and which can be read optically. A suitable layer thickness of the recording layer is 60–150 nm. A suitable pulse time is, for example, 20–100 ns. The crystalline information areas (bits) obtained upon recording may be circular and have, for example, a diameter of 1 μm. Elongate bits may alternatively be formed having a longitudinal dimension which varies from approximately 0.5 to 3 μm. As a result of this, optical recording of binary, EFM modulated information is possible.

In a favorable embodiment of the method in accordance with the invention an amorphous recording layer of InSb, GaSb or mixtures thereof is used.

The substances InSb and GaSb are chemical compounds having a covalent bond between the atoms of the molecule. These substances have a large melting heat and a comparatively high melting temperature. When these substances are used a crystalline area (bit) can be formed in the amorphous recording layer by means of pulsated laser light having a pulse time smaller than 15 ns.

The amorphous recording layer and the crystalline area (bits) formed therein are very stable. For example, in a climate test in which the recording element used in the method in accordance with the invention was stored for 1000 hours at a temperature of 65° C. and a relative humidity of 90%, it has been found that no changes had occurred either in the amorphous parts or the crystalline areas (bits) of the recording layer. The stability of the recording element used in the method in accordance with the invention can be qualified as being excellent. A life of at least 10 years can be ensured.

It is to be noted that a method of recording pictures on an amorphous film is disclosed in U.S. Pat. No. 3,716,844. In this method the amorphous film is heated in accordance with the picture or pattern to be recorded by means of a controlled enery beam, for example an electron beam or a laser beam. The recording material is, for example, Si, Ge or SiC having a layer thickness of 0.3 to 2.0 μm. Crystalline material is formed in the heated places. By causing a mixture of crystalline and amorphous material to be formed in the heated places, grey shades are possible. The heating times or treatment times of the amorphous material in such a picture recording are comparatively large, at least in the order of magnitude of milliseconds. As a result of this heating a synthetic resin substrate will degrade, deform or obtain a large birefringence. This does not play an important role in this picture recording, for example, in the form of a photographic picture or transparency, in which comparatively very large dimensions are at stake. Moreover, according to the embodiment disclosed in column 3, lines 31-47 of this patent a sapphire substrate is used. In contrast with the process described in this U.S. patent in the process of the invention binary (digital) recording is achieved. The process of the invention concerns the formation of very small information bits which are provided by means of pulsated laser light with an extremely short pulse time in a comparatively thin layer of $In_xSb_{1-x}$, $Ga_xSb_{1-x}$ or $(InSb)_ySe_{1-y}$ or mixtures thereof. The temperature during the formation of the information bits is comparatively high. The bits can be read by means of laser light.

The laser light pulse used in the method in accordance with the invention preferably has a maximum energy content of 1 nJ, the temperature in the exposed places being between the dynamic crystallization temperature and the melting-point of the crystalline recording material.

A suitable pulse energy is, for example, 0.3 nJ. The dynamic crystallization temperature is the temperature of the amorphous recording material at which complete crystallization takes place in a period of time of at most 200 ns. It has been found that in the exposed area a temperature of, for example, 1000°-1200° C. is reached with 0.3 nJ per pulse. It is striking that at this locally very highly heated areas no degradation or deformation of the synthetic resin occurs.

The invention also relates to an optical recording element which is suitable for use in the above-described method and which is characterized in that the recording element comprises a synthetic resin substrate or a substrate comprising a coating layer of a synthetic resin, and in that a recording layer is provided on the synthetic resin substrate in a maximum thickness of 150 nm, the recording layer comprising a recording material which satisfies the formulas $In_xSb_{1-x}$, $Ga_xSb_{1-x}$ or $(InSb)_ySe_{1-y}$ wherein $0.4 \leq x \leq 0.6$ and $0.7 \leq y \leq 1.0$ or mixtures thereof.

Figure 2:
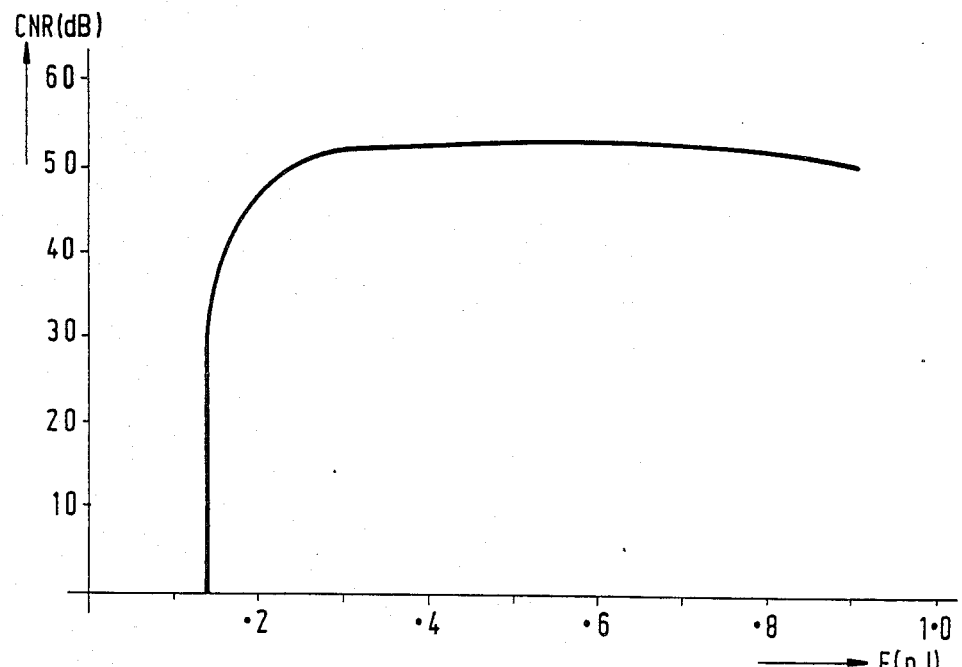

The invention will now be described with reference to specific embodiment and the drawing, in which FIG. 1 is a cross-sectional view of an optical recording element and FIG. 2 shows graphically the ratio between the pulse energy and the signal-to-noise ratio.

EXAMPLE

A substrate 1 (see FIG. 1) of glass having a diameter of 30 cm is provided on one side with a synthetic resin layer 2 of U-V-light-cured monomers based on acrylates. A groove 3 (servo track) 3 is provided in the synthetic resin layer. A 120 nm thick recording layer 4 of GaSb is provided on the layer of synthetic resin by means of a sputtering process. The amorphous recording layer 4 is coated with a synthetic resin coating lacquer 5 in a thickness of 10 μm. The optical recording of information is carried out by rotating the disc at a frequency of 4 Hz and exposing the disc at a radius of 70 mm to pulsated laser light which is focused on the recording layer via the supporting plate. The pulse frequency is 800 kHz. The pulse time is 60 ns. the power of the laser is varied from 2 mW to 15 mW so that the pulse energy varies from approximately 0.1 to 0.9 nJ. Crystalline bits 6 having a diameter of approximately 1 μm are formed in the exposed places. The bits are read by means of weak continuous laser light on the basis of differences in reflection between the crystalline bits and the amorphous surroundings. The signal-to-noise ratio was determined in a 10 kHz band-width.

FIG. 2 is a graph showing the signal-to-noise ratio in dB plotted against the pulse energy in nJ. With a pulse energy of 0.3 nJ a signal-to-noise ratio of 52 dB is reached.

Both the amorphous parts of the recording layer and the crystalline bits formed therein are very stable. This means that the optical recording element has a life of at least 10 years. The method described hereinbefore is a so-called "write once" optical recording. Although in principle a reversible process is possible in which the crystalline bits are converted again into amorphous material and the recorded information is erased, the method according to the invention provides such stable crystalline bits that conversion back to back to the amorphous starting material is not considered to be practical.

What is claimed is:

1. A method for the optical recording of information in which a recording element which comprises a substrate and a recording layer provided thereon is exposed to laser light which is modulated in accordance with the information to be recorded, in which an optically readable change in structure occurs in the recording layer in the exposed places which is read by means of laser light via the substrate on the basis of reflection differences with the surroundings, characterized in that an amorphous recording layer of $In_xSb_{1-x}$, $Ga_xSb_{1-x}$ or $(InSb)_y Se_{1-y}$, wherein $0.4 \leq x \leq 0.6$ and $0.7 \leq y \leq 1.0$ or mixtures thereof, is provided on a synthetic resin substrate in a maximum thickness of 150 nm and is exposed to infrared laser light having a wave length of 750–900 nm which is pulsated in accordance with the binary (digital) information to be recorded with a pulse time of at most 200 ns, a crystalline area (bit) with maximum dimensions of a few micrometers being formed in the amorphous layer in the exposed places.

2. A method as claimed in claim 1, characterized in that an amorphous recording layer of InSb, GaSb or mixtures thereof is used.

3. An optical recording element suitable for use in the method as claimed in claim 1 characterized in that the recording element comprises a synthetic resin substrate or a substrate comprising a coating layer of a synthetic resin and that a recording layer is provided in a maximum thickness of 150 nm on the synthetic resin substrate, the recording layer comprising a recording material which satisfies the formulas $In_xSb_{1-x}$, $Ga_xSb_{1-x}$ or $(InSb)_y Se_{1-y}$ wherein $0.4 \leq x \leq 0.6$ and $0.7 \leq y < 1.0$ or mixtures thereof.

* * * * *